United States Patent
Compton et al.

(10) Patent No.: US 7,330,208 B2
(45) Date of Patent: Feb. 12, 2008

(54) ELECTRONIC IMAGING SYSTEM WITH ADJUSTED DARK FLOOR CORRECTION

(75) Inventors: John T. Compton, LeRoy, NY (US); John F. Hamilton, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 759 days.

(21) Appl. No.: 10/795,465

(22) Filed: Mar. 8, 2004

(65) Prior Publication Data

US 2005/0195296 A1 Sep. 8, 2005

(51) Int. Cl.
*H04N 9/64* (2006.01)
(52) U.S. Cl. ..................... 348/243
(58) Field of Classification Search ............... 348/243, 348/241
See application file for complete search history.

(56) References Cited

U.S. PATENT DOCUMENTS

| | | | |
|---|---|---|---|
| 5,376,966 A | 12/1994 | Takase | |
| 5,757,425 A | 5/1998 | Barton et al. | |
| 5,778,044 A * | 7/1998 | Bruijns | 378/98.7 |
| 6,163,339 A | 12/2000 | Meunier | |
| 6,614,562 B1 | 9/2003 | Minemier | |
| 6,663,281 B2 * | 12/2003 | Aufrichtig et al. | 378/207 |
| 6,753,913 B1 * | 6/2004 | Bilhan et al. | 348/241 |
| 2003/0223539 A1 * | 12/2003 | Granfors et al. | 378/98.8 |
| 2004/0051797 A1 | 3/2004 | Kelly et al. | |

FOREIGN PATENT DOCUMENTS

| EP | 1 429 542 A1 | 6/2004 |
|---|---|---|
| EP | 1 530 363 A1 | 5/2005 |

* cited by examiner

*Primary Examiner*—Ngoc-Yen Vu
*Assistant Examiner*—Adam L. Henderson
(74) *Attorney, Agent, or Firm*—Peyton C. Watkins

(57) ABSTRACT

An electronic imaging system includes a method for calibrating an image sensor having a array of pixels each used in capturing an image, the method comprising the steps of capturing first dark floor values at a first time from substantially all of the pixels in the array, storing the first dark floor values, capturing second dark floor values at a second time from substantially all of the pixels in the array, using the first and second dark floor values to compute third dark floor values, using the third dark floor values when processing the captured image.

15 Claims, 7 Drawing Sheets

ELECTRONIC IMAGING SYSTEM WITH ADJUSTED DARK FLOOR CORRECTION

FIELD OF THE INVENTION

This invention relates generally to electronic imaging systems and, more particularly, to methods and apparatus for removing the dark floor from a captured image.

BACKGROUND OF THE INVENTION

Electronic imaging systems often include a facility for removing the dark floor from a captured image. Image sensors generally exhibit a phenomenon known as dark signal in which an image signal is detected even in the absence of light. The amount of dark signal varies in a random fashion from pixel to pixel in the image sensor, and the dark signal is sensitive to environmental conditions, notably temperature, but the base level of dark signal for a given pixel is reasonably consistent for a given image capture condition. One typical approach to removing the dark signal is to capture a dark frame, an image captured with the shutter closed, in close temporal proximity to the actual image capture (called a contemporary dark frame). This contemporary dark frame is then subtracted on a pixel by pixel basis from the actual image. One shortcoming of this method is that there is a level of noise in the dark signal, so the noise in the dark signal in the image will add (in some fashion related to the noise distribution) to the noise in the dark signal of the dark frame, thereby increasing the noise in the final processed image at the same time the base level dark signal is removed. A further shortcoming is that the dark frame capture should have the same conditions as the actual image capture, notably exposure time. Hence, for a long exposure time in which the dark signal has a long time to accumulate, the dark frame exposure time will have to be equally long, doubling the amount of time required to capture an image.

An alternative method for dark signal removal involves capturing a series of dark frames under some nominal conditions during a calibration process, perhaps at the time the electronic imaging system is manufactured. The series of dark frames is averaged together, thereby significantly reducing the noise component of the dark signal. This averaged dark frame is stored in a non-volatile memory and used as a baseline dark floor. Since the dark signal is sensitive to environmental and image capture conditions, the baseline dark floor would only be useful if the temperature and exposure time of an actual image capture matched the conditions under which the calibrated dark frames were captured. An image sensor generally has light shielded pixels that are used for general offset correction in image processing; the dark pixels from the actual image capture can be compared to the dark pixels from the baseline dark floor, and the result of the comparison can be used to adjust the baseline dark floor to match better the conditions of the actual image capture. This adjusted baseline dark floor is subtracted from the actual image. Although this reduces the additional noise and capture time associated with the previous dark floor removal method, it does have some shortcomings: the dark pixels are not uniformly distributed throughout the image sensor, so regional variations in the temperature of the sensor would not be detected; and some pixels may have a dark signal that behaves abnormally with respect to temperature or exposure time, so the baseline dark floor will not be adjusted correctly for those pixels.

SUMMARY OF THE INVENTION

The present invention is directed to overcoming one or more of the problems set forth above. Briefly summarized, according to one aspect of the present invention, the invention provides a method for utilizing both a dark frame captured contemporaneously with the capture of an actual image and a stored, calibrated dark floor in order to provide a reduced noise, adjusted dark floor that can be subtracted from the image. According to another aspect of the invention, the contemporary dark frame can be a function of the most recent captured dark frame and earlier dark frames in order to improve the contemporary dark frame. According to another aspect of the invention, a calibrated map of defective pixels can be used during the process of adjusting the dark floor to avoid defective pixels and thereby to improve the adjustment process. According to another aspect of the invention, the process of adjusting the dark floor can also be used to identify pixels that have become faulty with time or due to capture conditions and these newly identified defective pixels can be used to adjust the defective pixel map. According to another aspect of the invention, the adjusted defective pixel map can be used during the process of adjusting the dark floor at some subsequent time.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantages of removing the dark floor from a captured image without introducing other artifacts.

DETAILED DESCRIPTION OF THE INVENTION

Since electronic imaging systems are well known, the present description will be directed in particular to elements forming part of, or cooperating directly with, apparatus and method in accordance with the present invention. Elements not specifically shown or described herein may be selected from those known in the art.

Figure 1:
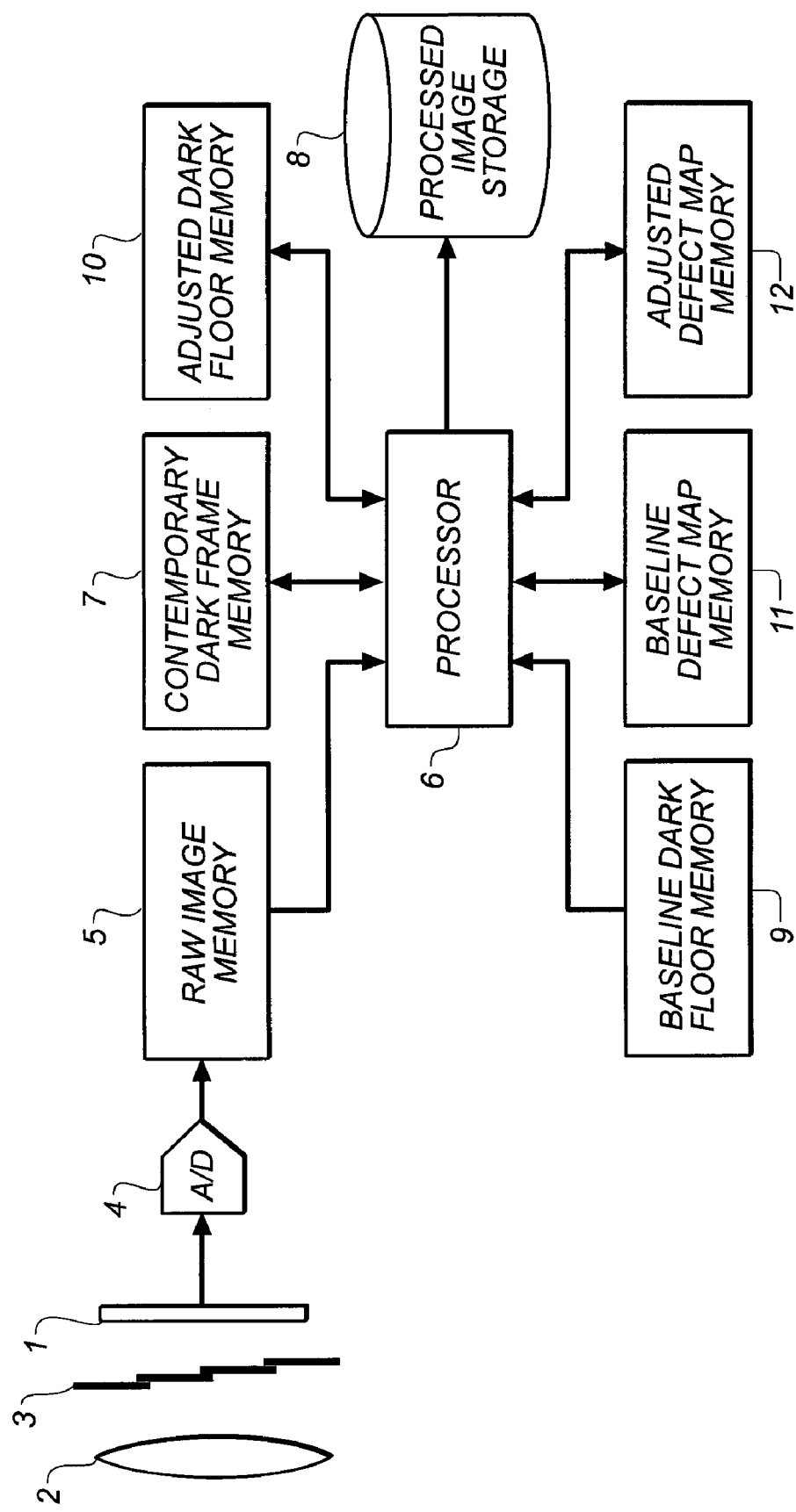
FIG. 1 is a block diagram of an electronic imaging system.

Referring initially to FIG. 1, an electronic imaging system has an optical assembly comprising the image sensor 1 which is exposed to light that first passes through the lens 2 and the shutter mechanism 3. As the sensor 1 is exposed to light, free electrons are generated and captured within the sensor's electronic structure. The resulting electronic charge at each pixel location is converted to a voltage which is digitized by the analog-to-digital converter 4 and the resulting data is stored in the raw image memory 5.

When a contemporary dark frame is generated, it first comes to the processor 6 by way of the raw image memory 5. The processor 6 can then move the dark frame to the contemporary dark frame memory 7. It is also possible that the electronic imaging system has a baseline dark floor memory 9. If so, the processor 6 can use the contemporary dark frame and the baseline dark floor to produce an adjusted dark floor which is stored in the adjusted dark floor memory 10.

Again, referring to FIG. 1, it is possible that the electronic imaging system has a baseline defect map memory 11 which holds a list of sensor defects that must be corrected for each image. If so, the processor 6 can use the contemporary dark frame and the baseline defect map to produce an adjusted defect map which is stored in the adjusted defect map memory 12. In addition, it is possible for the electronic imaging system to have a processed image storage 8 that can used to store intermediate and final output from the processor 6.

Figure 2A:
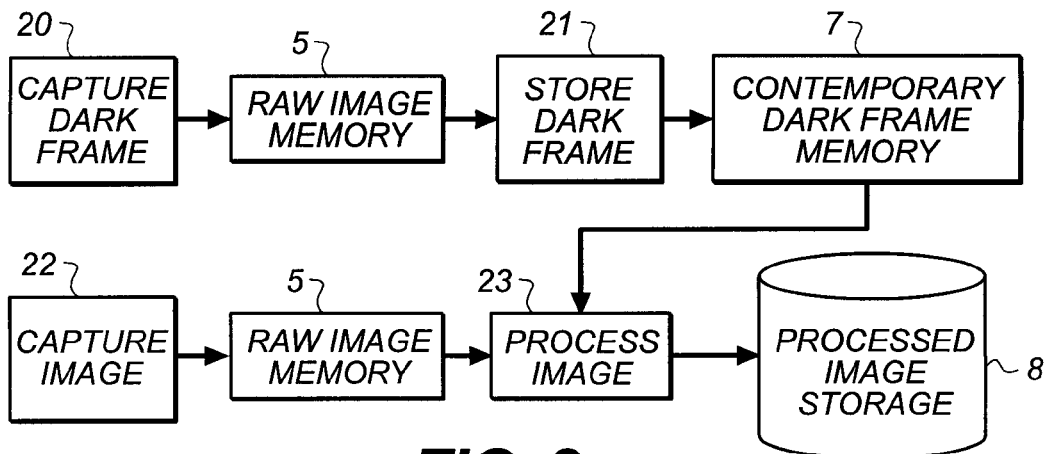
FIG. 2a (prior art) is a flow diagram of a typical image processing method including dark floor correction using a dark frame that is captured contemporaneously with an actual image capture.

One well known method of accounting for dark current, shown in FIG. 2a, begins with a dark frame capture 20 that causes the dark frame data to be stored in the raw image memory 5. The next action is to store the dark frame 21 which moves the data from the raw image memory 5 to the contemporary dark frame memory 7. The next step is to capture an image 22, which puts the image data into the raw image memory 5. The action of processing the image 23 can now occur wherein the image data from the raw image memory 5 is combined with the contemporary dark frame data from the contemporary dark frame memory 7 to produce results that are stored in the processed image storage 8.

Figure 2B:
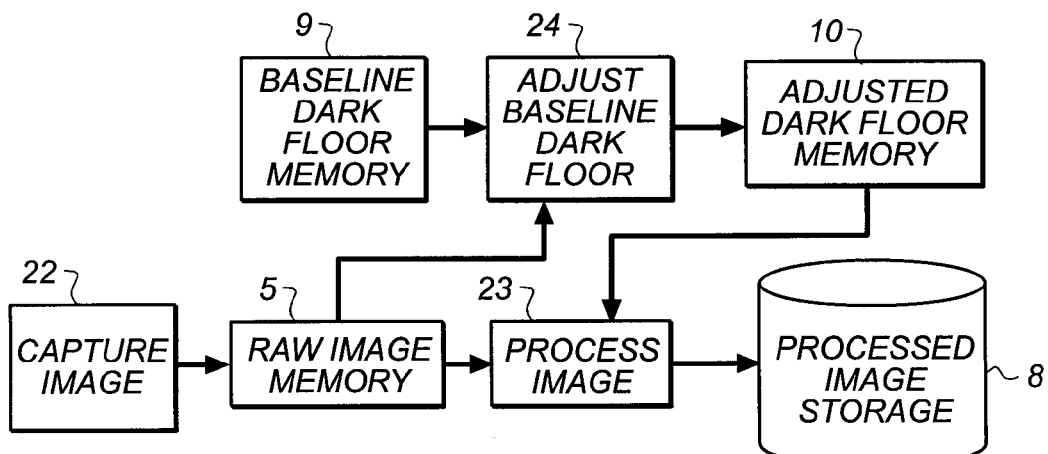
FIG. 2b (prior art) is a flow diagram of a typical image processing method including dark floor correction using a dark floor that is captured and stored during a calibration process at some time prior to the actual image capture, then adjusted based on the actual image capture data before being applied to the image.

Another well known method of accounting for dark current, shown in FIG. 2b, begins with an image capture 22, which puts the image data into the raw image memory 5. The next step is to adjust the baseline dark floor 24, which takes data from the raw image memory 5 and from the baseline dark floor memory 9 to produce results which are put into the adjusted dark floor memory 10. The action of processing the image 23 can now occur wherein the image data from the raw image memory 5 is combined with the adjusted dark floor data from the adjusted dark floor memory 10 to produce results that are stored in the processed image storage 8.

Figure 2C:
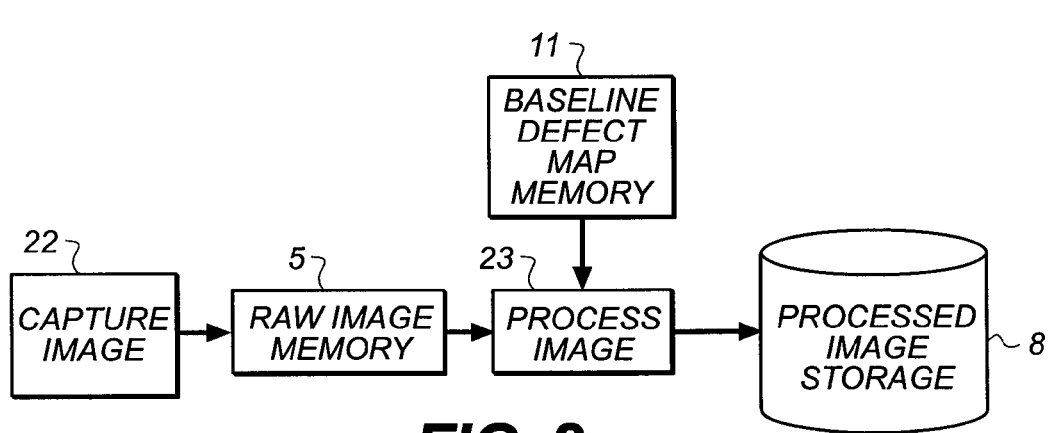
FIG. 2c (prior art) is a flow diagram of a typical image processing method including defective pixel correction using a defect map to identify defective pixels that is captured and stored during a calibration process at some time prior to the actual image capture.

A well known method of accounting for sensor defects, shown in FIG. 2c, begins with an image capture 22, which puts the image data into the raw image memory 5. The next step is to process the image 23, which takes data from the baseline defect map memory 11 data and from the raw image memory 5, to produce results which are put into the processed image storage 8.

Figure 3:
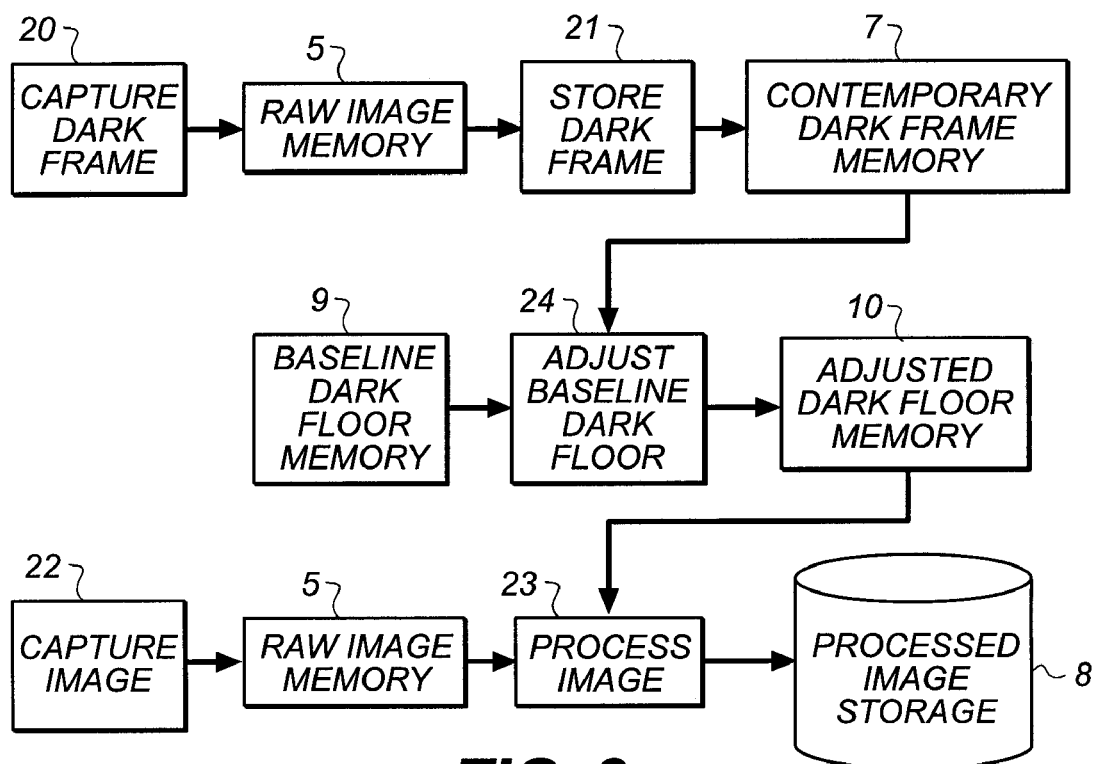
FIG. 3 is a flow diagram of an image processing method including dark floor correction that utilizes both a contemporary dark frame and a calibrated dark floor to create a new, adjusted dark floor.

Now, referring to FIG. 3, the present invention addresses the problem that the contemporary dark frame has unwanted noise. One method of the present invention begins with a dark frame capture 20, which puts the dark frame image data into the raw image memory 5. The next step is to store the dark frame 21, which takes the data from the raw image memory 5 and puts it into the contemporary dark frame memory 7. The action of adjusting the baseline dark floor 24 can now occur wherein the baseline dark floor image data, taken from the baseline dark floor memory 9, is scaled in response to the statistics of the contemporary dark frame image data, which is taken from the contemporary dark frame memory 7. The scaled baseline dark floor image data is then compared on a pixel-by-pixel basis to the contemporary dark frame. To the extent that the scaled baseline dark floor image data matches the contemporary dark frame data, the scaled dark floor image data is stored in the adjusted dark floor memory 10; if there is a sufficiently large difference between the scaled baseline dark floor image data and the contemporary dark frame data, then the contemporary dark frame data is stored in the adjusted dark floor memory 10. The function that selects between the scaled baseline dark floor memory and the contemporary dark frame data could simply select from one or the other based on comparing the difference between the two to a threshold limit value. The threshold could be based on the expected noise statistics of the contemporary dark frame data: if the difference is within the expected noise, the scaled baseline dark floor is chosen, but if the difference is greater than the expected noise then the contemporary dark frame data is chosen. Alternatively, the function could provide a weighted average of the values from the adjusted baseline dark floor memory and the contemporary dark frame data, wherein the weighting is a function of the difference between the two values. After the image capture 22, the image data is stored in the raw image memory 5. The action of the image processing 23 now occurs wherein the image data is taken from the raw image memory 5 and combined with the adjusted dark floor image data, which is taken from the adjusted dark floor memory 10, to produce results that are stored in the processed image storage 8.

Although the method just described is very simple to implement, it is unresponsive to local variations in operating conditions for the sensor, notably local variations in temperature; to the extent that these local variations render incorrect the scale factor applied globally to the baseline dark floor, the method will erroneously favor the contemporary dark frame. Another method of the present invention addresses this shortcoming by adjusting the baseline dark floor image data in response to the local statistics of the contemporary dark frame image data. Referring again to FIG. 3, this alternative process of adjusting the baseline dark floor 24 is now disclosed. The contemporary dark frame data is a direct measurement of dark current noise under current conditions. Because there are often local thermal gradients, a correction scale factor needs to be determined at a number of positions on the sensor face. Focusing on a single region for the moment, consider a small region of 32×32 pixels containing a total of 1024 pixels. Let $M_k$ denote the value at the $k^{th}$ pixel ($1 \leq k \leq 1024$) stored in the baseline dark floor image data. Likewise, let $X_k$ denote the value at the $k^{th}$ pixel ($1 \leq k \leq 1024$) stored in the contemporary dark frame image data. The correction scale factor $\alpha$ for this 32×32 block of pixels is computed according to:

$$\alpha = \sqrt{\frac{\sum \frac{X_k^2}{M_k}}{\sum M_k}} \quad \text{(EQ 1)}$$

where in each case the summation index k runs from 1 to 1024. It should be noted that this method accounts for systematic effects such as exposure time as well as for local effects such as temperature differences across the sensor. Once the correction scale factor has been determined at a number locations, for example on the lattice points of a rectangular array, the correction scale factor can be interpolated at each pixel location using a standard interpolation method such as bicubic interpolation. The adjusted dark floor image data is then produced by multiplying, at each pixel location, the dark floor pixel value M by the pixel correction scale factor $\alpha$.

Figure 4:
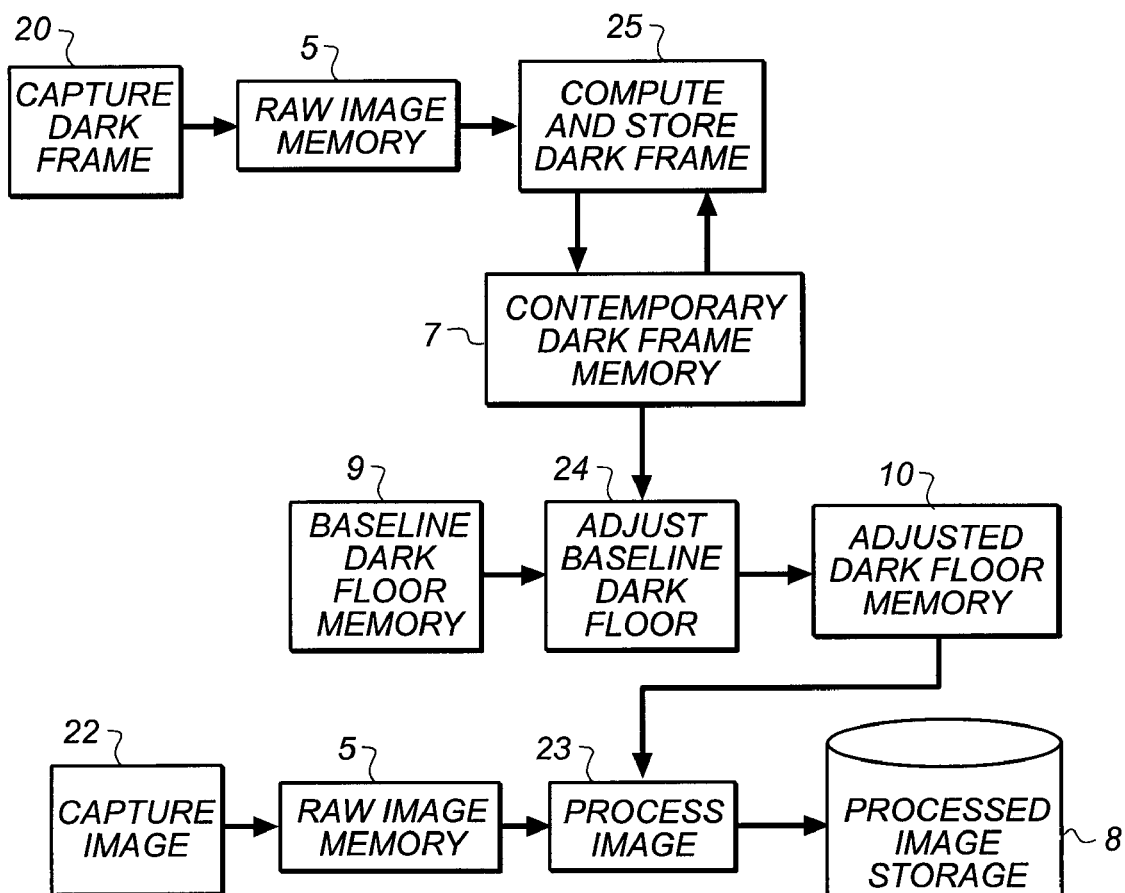
FIG. 4 is a flow diagram of an image processing method including dark floor correction that expands on FIG. 3 by allowing the contemporary dark frame to be a function of a number of contemporary dark frame captures.

Now, referring to FIG. 4, an augmented form of the method of FIG. 3 is shown. The augmented method begins with a dark frame capture 20, which puts the dark frame image data into the raw image memory 5. The next step is to compute and store the dark frame 25 wherein the data from the raw image memory 5 and existing contemporary dark frame data, taken from the contemporary dark frame memory 7, are combined and put back into the contemporary dark frame memory 7. Multiple dark frame capture may be made at this time if so desired. As before, the action of adjusting the baseline dark floor 24 can now occur and the remaining steps in FIG. 4 are identical to those shown in FIG. 3.

Figure 5:
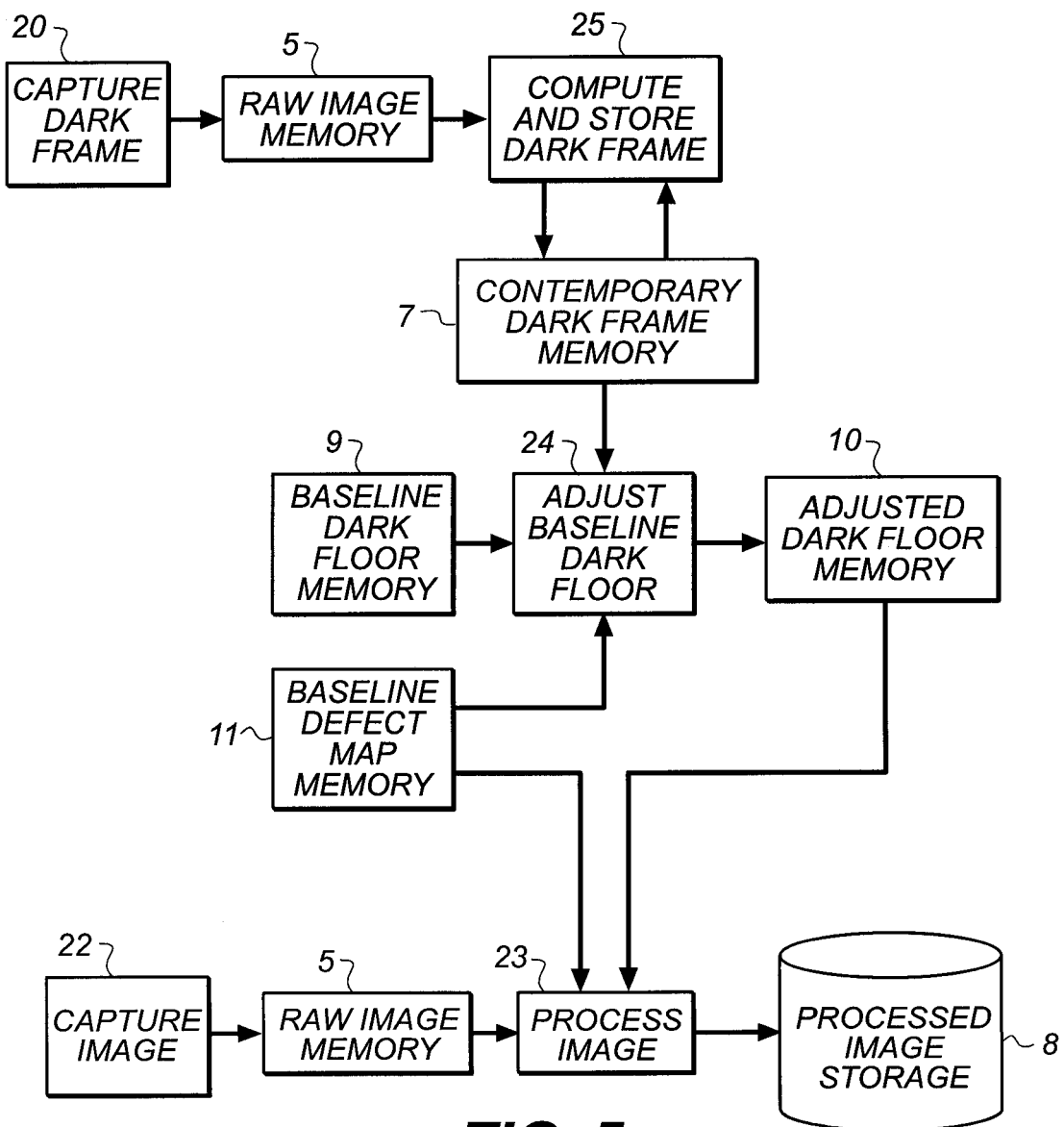
FIG. 5 is a flow diagram of a image processing method including dark floor correction and defective pixel correction with the defective pixel correction used both to adjust the dark floor (to avoid using defective pixels in adjusting the dark floor) and to identify pixels requiring replacement in the image.

Now, referring to FIG. 5, an augmented form of the method of FIG. 4 is shown. The method shown in FIG. 5 is identical to that of FIG. 4 up to the step of adjusting the baseline dark floor 24, wherein the baseline dark floor image data, taken from the baseline dark floor memory 9, is locally adjusted in response jointly to the local statistics of the contemporary dark frame image data, taken from the contemporary dark frame memory 7, and to the baseline defect map data, taken from the baseline defect map memory 11. The adjusted baseline dark floor image data is then stored in the adjusted dark floor memory 10. After the image capture 22, the image data is stored in the raw image memory 5. The action of the image processing 23 now occurs wherein the image data is taken from the raw image memory 5 and combined jointly with the adjusted dark floor image data, taken from the adjusted dark floor memory 10, and with the baseline defect map data, taken from the baseline defect map memory 11, to produce results that are stored in the processed image storage 8.

The role of the baseline defect map data is now disclosed. The baseline defect map data identifies defective pixels known to produce unreliable image data. Thus, when adjusting the baseline dark floor 24, computing the statistics of a contemporary dark frame excludes data from the defective pixels. Likewise, when processing the image 23, raw image data from these same defective pixels are corrected before being used to form the processed image data which is stored in the processed image storage 8.

Figure 6:
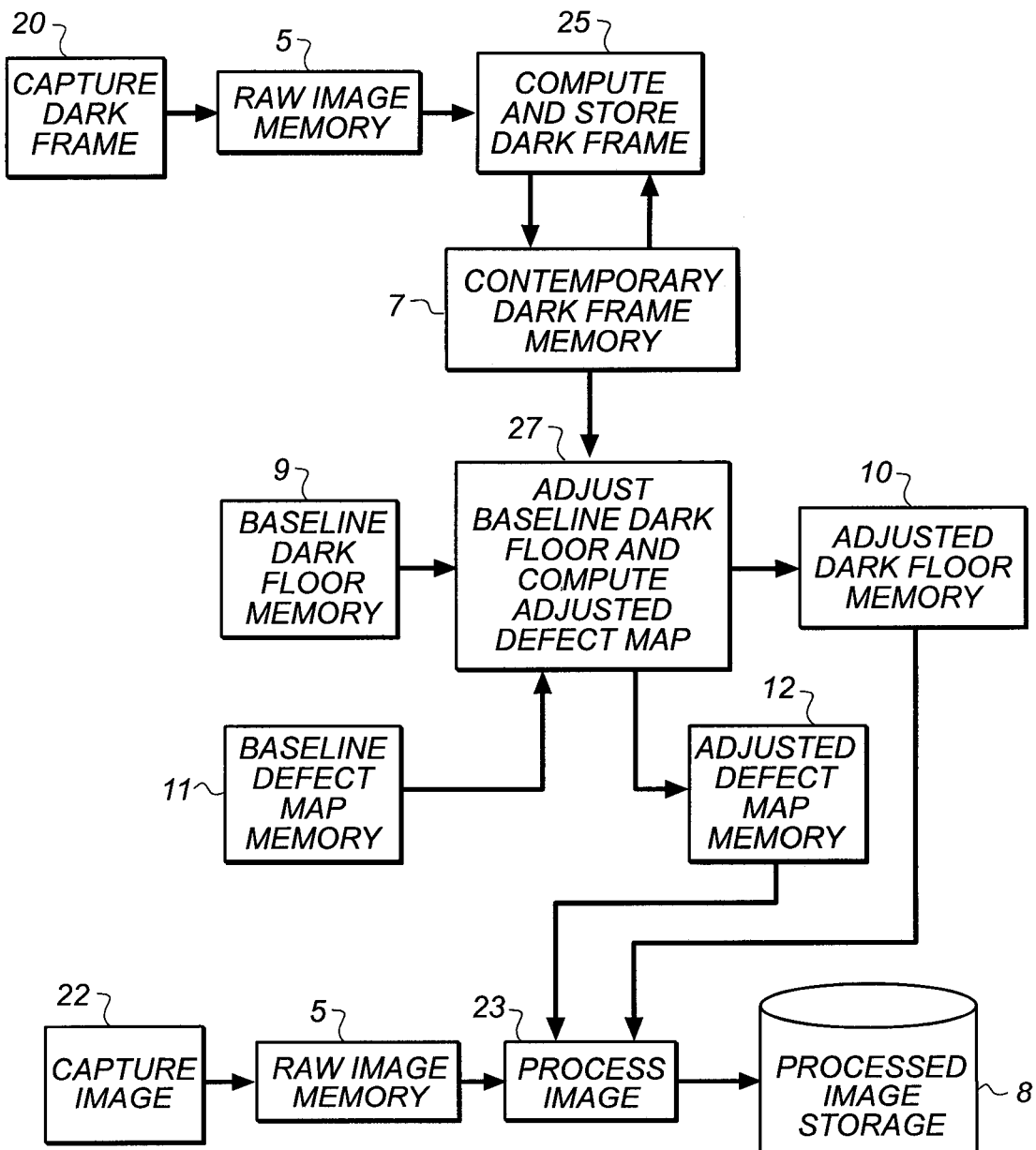
FIG. 6 is a flow diagram of an image processing method including dark floor correction and defective pixel correction that expands on FIG. 5 by allowing the calibrated defect map to be adjusted to include additional or different defective pixels identified during the dark floor adjustment process.

Referring to FIG. 6, an augmented form of the method of FIG. 5 is shown. The method shown in FIG. 6 is identical to that of FIG. 5 up through the step of compute and store dark frame 25. After this, a new step, adjusting the baseline dark floor and computing the adjusted defect map 27, is performed wherein the baseline dark floor data and the baseline defect map data are jointly adjusted to produce results that are stored in the adjusted dark floor memory 10 and the adjusted defect map memory 12, respectively. The final step of processing the image 23 now uses adjusted defect map data, taken from the adjusted defect map memory 12, instead of baseline defect map data, taken from baseline defect map memory 11, as was the case in FIG. 5.

Figure 7:
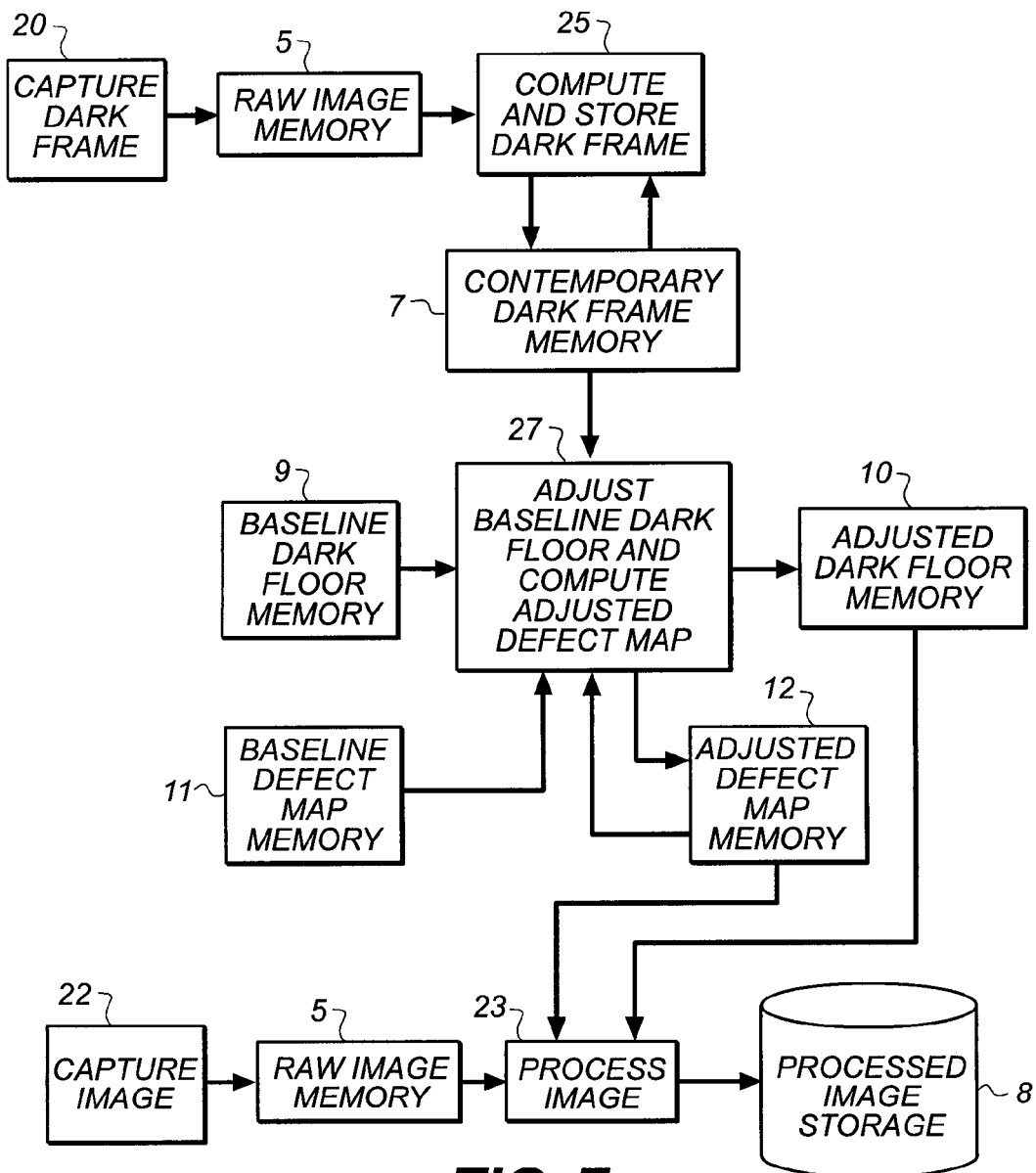
FIG. 7 is a flow diagram of an image processing method including dark floor correction and defective pixel correction that expands on FIG. 6 by allowing the adjustment of the calibrated defect map to include knowledge of previous adjustments to the defect map.

Now, referring to FIG. 7, an augmented form of the method of FIG. 6 is shown. The method shown in FIG. 7 is identical to that of FIG. 6 except that the step of adjusting the baseline dark floor and computing the adjusted defect map 27 also uses the adjusted defect map data from a previous capture, taken from the adjusted defect map memory 12.

The role of the adjusted defect map data, used in both FIGS. 6 and 7, is now disclosed. The baseline defective map data identifies defective pixels that existed at some remote time in the past, such as when the camera was calibrated. Since it is possible for some pixels to become defective after the baseline defect map was created, it is desirable to adjust the defect map to include the newly converted defective pixels. One method of discovering such a conversion is to notice a significant change in the contemporary dark frame noise statistics of a particular pixel. The adjusted defect map is more up to date than the baseline defect map and therefore better data.

The invention has been described with reference to a preferred embodiment. However, it will be appreciated that variations and modifications can be effected by a person of ordinary skill in the art without departing from the scope of the invention.

PARTS LIST

1 Image Sensor
2 Lens
3 Shutter Mechanism
4 Analog-to-Digital Converter
5 Raw Image Memory
6 Processor
7 Contemporary Dark Frame Memory
8 Processed Image Storage
9 Baseline Dark Floor Memory
10 Adjusted Dark Floor Memory
11 Baseline Defect Map Memory
12 Adjusted Defect Map Memory
20 Capture Dark Frame Procedure Block
21 Store Dark Frame Procedure Block
22 Capture Image Procedure Block
23 Process Image Procedure Block
24 Adjust Baseline Dark Floor Procedure Block
25 Compute and Store Dark Frame Procedure Block
27 Compute and Store Dark Frame and Compute Adjusted Defect Map Procedure Block

The invention claimed is:

1. A method for calibrating an image sensor having a array of pixels each used in capturing an image, the method comprising the steps of:
   (a) capturing a series of dark frames at a first time from substantially all of the pixels in the array and averaging the series of dark frames together to generate a baseline dark floor comprising first dark floor values;
   (b) storing the first dark floor values;
   (c) capturing second dark floor values at a second time from substantially all of the pixels in the array, wherein the second time is subsequent to the first time;
   (d) using the first and second dark floor values to compute third dark floor values;
   (e) using the third dark floor values when processing the captured image; and
   (f) repeating steps (c)-(e), wherein the same first dark floor values are used to compute third dark floor values.

2. The method as in claim 1, wherein step (c) includes capturing the second dark floor substantially close temporal proximity to the actual captured image.

3. The method as in claim 1, wherein step (d) includes scaling the first dark floor values based on statistics from the second dark floor values and computing third dark floor values by selecting between the scaled first dark floor values and the second dark floor values.

4. The method as in claim 3, wherein step (d) includes selecting between the scaled first dark floor values and the second dark floor values based on comparing the difference between the two values to a threshold value.

5. The method as in claim 4, wherein step (d) includes computing third dark floor values by computing a weighted average between scaled first dark floor values and second dark floor values.

6. The method as in claim 1, wherein step (d) includes computing a gain function based on both the first and second dark floors for substantially each pixel in the sensor.

7. The method as in claim 6, wherein computing the gain function includes determining the gain function at a plurality of specified pixel neighborhoods and interpolating the gain function over the remaining pixels.

8. The method as in claim 7, wherein the gain function is expressed by the equation:

$$\alpha = \sqrt{\frac{\sum \frac{X_k^2}{M_k}}{\sum M_k}}$$

where:
$\alpha$ is the gain function for a given pixel neighborhood,
$M_k$ is the value stored in the baseline dark floor image data for the $k^{th}$ pixel in the given pixel neighborhood, and
$X_k$ is the value stored in the contemporary dark frame image data for the corresponding $k^{th}$ pixel in the given pixel neighborhood.

9. The method as in claim 1 further comprising the step of using a baseline defective pixel map for storing locations of one or more defective pixels; wherein step (d) uses the locations of the defective pixels in computing the third dark floor values.

10. The method as in claim 9, wherein step (d) further includes creating an adjusted defective pixel map.

11. The method as in claim 10, wherein step (d) further includes using a previously computed adjusted defective pixel map.

12. A camera comprising:
   (a) an image sensor having a array of pixels each used in capturing actual images;
   (b) memory having a baseline dark floor comprising first dark floor values, wherein the baseline dark floor comprises an average of a series of captured dark frames;
   (c) a computational unit for computing a sequence of third dark floor values, wherein for each computation the same dark floor values and newly captured second dark floor values are used to compute third dark floor values, and wherein particular third dark floor values are used to process one or more actual captured images.

13. The camera as in claim 12, wherein the second dark floor values are captured substantially close temporal proximity to the actual captured image.

14. The camera as in claim 12, wherein a gain function is computed based on both the first and second dark floors for substantially each pixel in the sensor.

15. The camera as in claim 14, wherein the gain function is determined at a plurality of specified pixel neighborhoods and remaining gain is interpolated over the remaining pixels.

* * * * *